UNITED STATES PATENT OFFICE.

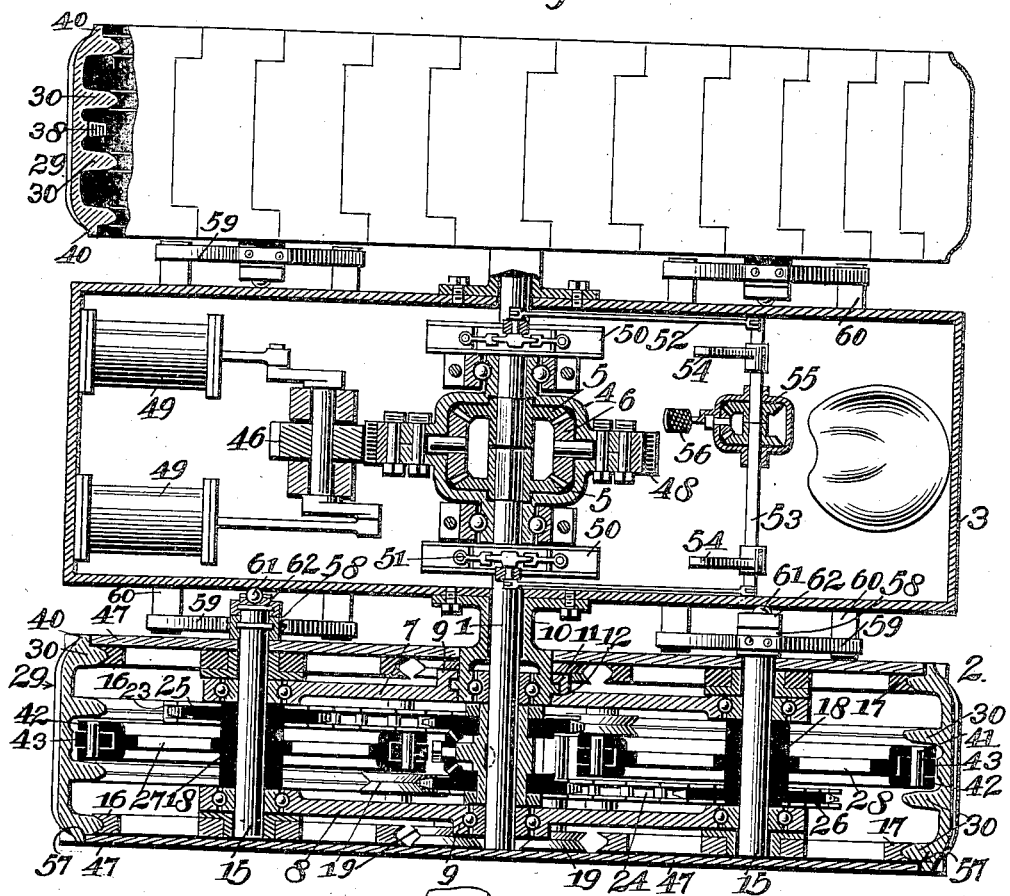

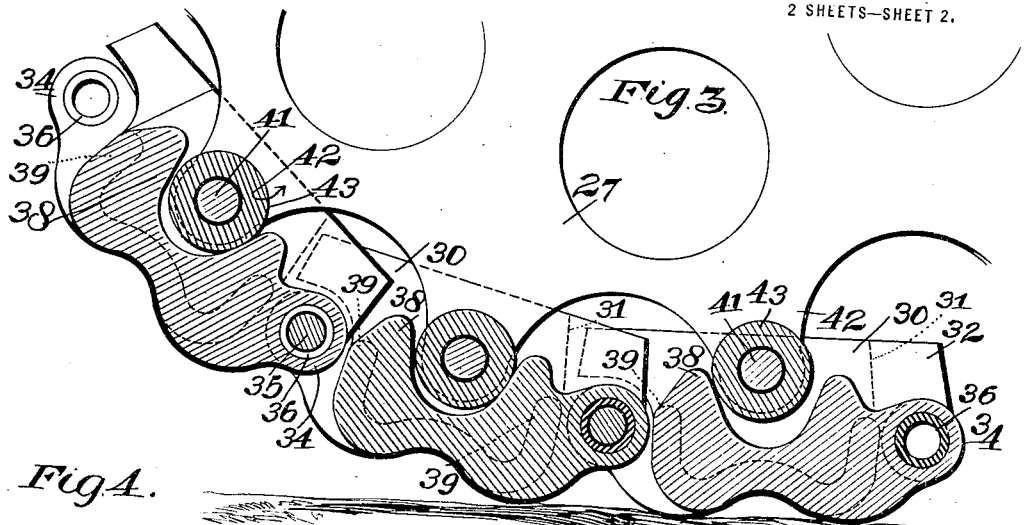
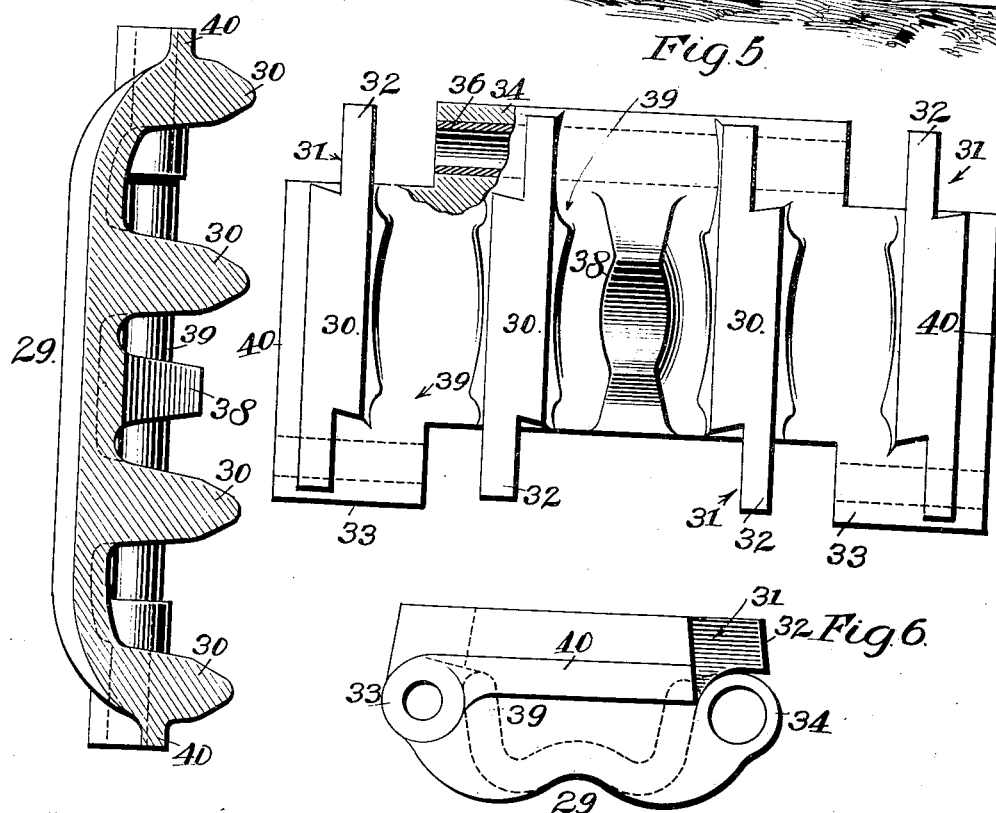

MORTON LEA ADAMS, OF SEATTLE, WASHINGTON, ASSIGNOR TO ADAMS TRACTOR COMPANY, OF SEATTLE, WASHINGTON, A CORPORATION OF WASHINGTON.

TRACTOR ATTACHMENT FOR MOTOR-VEHICLES.

1,309,053.  Specification of Letters Patent.  Patented July 8, 1919.

Application filed July 26, 1918. Serial No. 246,931.

*To all whom it may concern:*

Be it known that I, MORTON LEA ADAMS, a citizen of the United States, and a resident of Seattle, in the county of King and State of Washington, have invented certain new and useful Improvements in Tractor Attachments for Motor-Vehicles, of which the following is a specification.

My invention relates to improvements in tractors, it being more particularly an improvement in tractor attachments for motor driven vehicles, and it consists in the constructions, combinations and arrangements herein described and claimed.

An object of my invention is to provide primarily a tractor designed principally for farm work and consequently one of a rugged construction, which embodies means residing in the tractor attachments whereby the tractor can be turned within its own length simply by the manipulation of the braking devices.

Another object of the invention is to provide a tractor attachment which embodies a compensating or differential gear whereby a uniform driving torque is applied to the axles at both ends.

A further object of the invention is to provide a tractor attachment wherein the construction of the supporting elements whereby the attachment is hung in place, may be readily altered to adapt it to axle mountings of the full, three-quarter or semi-floating types.

A further object of the invention is to provide a braking mechanism of a novel construction for coöperation with the brake drums of the differential drive axles, which includes a brake jack shaft with a differential gear embodied therein to enable either the locking of both brakes or the locking of but one.

Other objects and advantages will appear in the following specification, reference being had to the accompanying drawings in which:

Figure 1 is a horizontal section of the improved tractor.

Fig. 2 is an enlarged detail section showing the differential or compensating gear of one of the tractor attachments, Fig. 3 is a detail sectional view of one of the tread driving sprockets and a portion of the improved tractor belt, Fig. 4 is a longitudinal section of one of the tread links, Fig. 5 is a plan view of one of the tread links a part being shown in section, and Fig. 6 is an end elevation of one of the links.

The present invention is an improvement on the subject matter of my co-pending application for a patent on tractor attachments, filed April 20, 1918, Serial No. 229,774. The improvement lies more particularly in the driving means for the tread driving sprockets at the ends of the attachment, and in order that the relationship of the two inventions may more readily be understood,

*A synopsis* of the former construction is here outlined.

The construction in the former application involves a driven axle which projects beyond an axle casing. An axle housing is fitted on the axle casing and includes an extension support which is applied directly to the extremity of the axle, a yoke in the axle housing enables the fitting of a pair of integrally formed driving sprockets on the axle. The present improvement consists of the replacing of these integral driving sprockets, with a differential driving gear so that the driving torque is applied uniformly to the axles at both ends of the attachment.

*The improved tractor attachment* is similar in many respects to the tractor attachment of the former application, and before describing the invention in the attachment attention is directed to the construction of the attachment. One member of a two-part drive axle 1 projects into each of the two tractor attachments 2 and provides the mounting for the tractor attachment on the tractor body 3.

Frames 7 and 8 inside of the tractor attachment 2 are spaced apart as illustrated, and have hubs 9 in the middle through which the supporting members extend. The axle casing 10 extends into the tractor attachment where it enlarges into a hub which has an annular rib 11. The rib 11 fits in a groove 12 in the hub 9 of the frame 7 and thus prevents the frame from sliding off. The drive axle 1 has a ball bearing on the inside of the axle casing hub and there is a second ball bearing between the drive axle and the outer frame 8. This is a mounting of the well-known semi-floating type.

While the drawings do not disclose the three axle mountings usually employed in automobile manufacture namely, the full, three-quarter and semi-floating types, yet I wish to make it understood that the tractor attachment 2 can be mounted by using any of the three types by making but minor changes. It is not deemed necessary either to illustrate or describe all three mountings, it being thought sufficient to show but the semi-floating drive axle mounting referred to above.

Resuming the description of the tractor attachment, axles 15 are journaled in the ends of the frames 7 and 8. Suitable ball bearings are provided for the axles. Pairs of idler wheels 16, 17 are mounted on the axles 15 at the front and rear of the attachment. In this construction as in that of the former invention, it is important that these idler wheels be peripherally grooved. It is important that V-grooves be used in order that but a minimum amount of friction occurs in engaging and disengaging.

Mounted on the axles 15 between the bearings of the frames 17, are sprocket hubs 18. The hubs of the axles at the front and rear respectively, carry tread driving sprockets 27, 28. These driving sprockets are in longitudinal alinement and in the center of the tractor attachment 2. Fixed on the hubs 18 and on opposite sides of the respective tread driving sprockets, are driven sprockets 25, 26 to which drive chains 23 and 24 are applied. These chains are driven by the differential gear mechanism on the drive axle 1, which constitutes one of the important improvements and which will be described later.

*The tread driving sprockets* which are both alike, are different from those shown in the former construction in that the rollers 43 are carried by the sprockets instead of by the tread links. The rollers 43 are journaled on pins 41 in the bifurcations 42 which are arranged at proper intervals on the periphery of the tread driving sprockets as shown in Fig. 3.

This arrangement of the tread driving sprockets obtains a rolling action of the teeth of the sprockets over the teeth of the tread links with which they engage. The manner of contact between the two is illustrated in Fig. 3 wherein it is to be observed that the engagement between the two occurs only on the driving side. As a result, there is a clearance between the remainder of the parts and therefore friction is eliminated to a considerable degree.

Sets of grooved sheaves which are disposed on the inside and outside of the frames 7 and 8 respectively, are mounted on shafts which are supported near the lower edges of the frames. These sheaves are for the purpose of keeping the lower strand of the tread in a straight line and to prevent it from buckling. The prevention of the buckling of the lower strand of the tread is necessary so that there can be no binding between the lower edges of the side plates 47 and the recesses 57 of the tread links, which are occupied by the side plates.

In this connection it is desirable to say that the lower edges of the side plates are formed with plow kerfs similarly as in the other construction, for the purpose of plowing out dirt accumulated by the edges of the tread, and preventing it from entering the inside. However, since this is subject matter already fully covered, it is thought unnecessary to enter into a detailed description of the construction just referred to.

*The differential drive mechanism* comprises sprockets 13 and 14 upon which segmental bevel gears 20 and 21 are formed on the opposing sides. Inwardly projecting lugs 22 which are practically extensions of the bevel gears, are adapted to engage the bevel pinion 37 in the event of a breakage of one of the drive chains 23, 24. It will be readily understood that were it not for the provision of the lugs 22, upon the breakage of one of the drive chains referred to, the tractor attachment would be rendered inoperative since the bevel pinion 37 would merely travel around with the drive axle 1 running on the bevel gear of the sprocket with the intact drive chain, and simply counter-rotating the then free sprocket of the broken chain.

However, with the provision of the lugs 22, should one of the drive chains break the bevel pinion 37 will soon move around into contact with the lugs 22 and lock thereagainst. While the differential driving action is thus somewhat interfered with, yet the tractor attachment is not rendered inoperative since the driving of one of the driven sprockets 25, 26 still continues.

A spider 44 which is nothing more than a hub keyed on the drive axle 1, provides the support for the bevel pinion 37. Under normal conditions, the bevel pinion has but very little movement relative to the bevel gear segments 20, 21. It is not until one of the drive chains is broken, that the bevel pinion moves to any extent relative to these gear segments. The spider 44 has reduced bearings upon which the sprockets 13 and 14 are loosely mounted. The ends of the bearings are threaded to receive check nuts 45 which hold the sprockets in place.

The improved tread link is constructed somewhat on the same order as the tread link in the former construction, in that it has a plurality of rail portions 30 which are arranged to fit together and form continuous tracks on the inside upon which the idler wheels and the sheaves run. The foremost consideration in designing the tread link as shown in Fig. 5 is, to manufacture it as a drop forging. The construction of the other tread link is such that it must be cast.

Resuming the description of the improved tread link, the rail portions 30 are cut away at 31 on the ends at opposite sides as clearly shown in Fig. 5. The remaining leaves 32 engage the companion leaves of another tread link and occupy the cut away portions of the rail portions of the companion tread link, so that the continuous tracks referred to are provided. A pair of knuckles 33 on one transverse edge of the tread link, embrace a single knuckle 34 on the transverse edge of another tread link.

A hinge pin 35 holds the links together. The hinge pin has a driving fit in the bores of the knuckles 33. A bushing 36 in the larger bore of the single knuckle 34, provides the swinging connection of one knuckle on the other. A tooth 38 is formed in the middle of each tread link. Each tooth consists of a pair of upward projections with an intervening valley into which the sprocket roller 43 advances when the engagement of the tread driving sprocket with the tractor belt occurs.

The manner of contact between the sprocket roller and the tractor belt has already been described in connection with Fig. 3, but it may be repeated briefly that the engagement of the roller with the tooth occurs only on one side. Considerable friction is avoided by the freedom of the remaining surfaces. The tread link has, what might be termed, a skeleton formation. The exposed wall may be made as thick as desired so as to give the required strength. This wall terminates in ridges 39 inside of the knuckles, and these ridges rigidify the tread link transversely. The exposed surface itself may be of any desired shape, so long as the advantage of making the tread link as a drop forging, is preserved. The longitudinal edges 40 of the tread link extend beyond the extreme rail portions and form the recesses 57 which are occupied by the side plates.

The tractor body 3.

A differential gear case 4 is journaled in bearings in the tractor body and incloses the bevel gears 5 which are fixed on the ends of the members of the two-part drive axle 1. Bevel pinions 6 carried by the case 4 engage the gears 5. This construction constitutes an ordinary differential gearing.

The axle 1 is driven by means of a spur pinion 46 which meshes with a spur gear 48 on the differential case 4. The gear 48 is in the nature of a ring which is fitted on the periphery of the joint of the gear case. A number of holes are bored transversely of the gear ring in the middle of the joint, and the bolts which are then inserted hold the gear in place. The spur pinion 46 may be driven by any suitable power, a steam engine 49 being diagrammatically illustrated in Fig. 1.

Brake drums 50 are fixed on the members of the drive axle 1. A brake band on each drum is arranged to be contracted by means of a knuckle 51 to which a link 52 is connected. Each link 52 reaches rearwardly and is connected to one member of a two-part brake jack shaft 53. Handles 54 on the respective members, enable the locking of the individual brake drums; that is to say one brake drum may be locked independently of the other. It is by this arrangement that the tractor is steered and can be turned within its length.

A differential gearing 55 joins the members of the jack shaft, and the casing of the gearing has a pedal 56. When it is desired to lock both brake drums so as to brake the tractor, the operator presses on the pedal 56 which moves both members of the jack shaft together.

In order to prevent lateral strains on the drive axle 1 in turning the tractor, the inner ends of the axles 15 are made to project through the inner side plates 47, and are provided with spring blocks 58. Semi-elliptic springs 59 are fastened on the top and bottom of each spring block. Stops 60 fixed on the sides of the tractor body 3, project between the free ends of the springs 59. The arrangement of the stops and springs allows a certain amount of oscillating motion of the tractor attachment on the drive axle 1 and in a measure, absorbs some of the shocks. Balls 61 held in bearings 62 carried on the inner ends of the axles 15, roll over the sides of the tractor body 3 and prevent the lateral twisting of the tractor attachment 2 with respect to the tractor body 3 and on the drive axle 1 by maintaining an even space.

The operation.

While the operation of the tractor and the tractor attachments on the sides thereof is thought to be fully understood from the foregoing, yet a brief review is thought to be of advantage. It may be stated in passing, that the tractor body 3 in actual practice may be provided with wheels at the front so that the tractor is capable for use in road work. The present illustration, however, omits the showing of the wheels, since as stated above their addition is merely an incidental feature.

The foremost feature in the tractor, resides in the manner of steering it. Under ordinary conditions the brake drums 50 are free and consequently the members of the two-part drive axle 1 are rotated in unison so that the tractor proceeds forwardly. Should it now be desired to make a turn, one or the other of the handles 54 are pushed forwardly when the corresponding brake band locks on the companion brake drum causing the bevel gear 5 to remain stationary. The other tractor attachment continuing to move, causes the turn to be made. Should it be desired to brake the forward movement of the tractor, the pedal 56 is depressed and both brake drums are locked together.

It has been found in actual experience that in order to obtain a uniform driving action of the tread drive sprockets 27, 28 at both ends of the tractor attachment, it is absolutely necessary to provide the differential drive mechanism illustrated in Fig. 2. The small relative movement to which the sprockets 13 and 14 are susceptible of in respect to each other under ordinary circumstances, compensates for the ordinary inability to properly aline the drive chains on the drive sprockets and the companion driven sprockets as is the case in the former construction above referred to. The differential drive mechanism causes the drive chains 23, 24 to adapt themselves directly to the driven sprockets 25, 26 so that the power is applied to both sprockets 27 and 28. The importance of this arrangement lies in the fact that excessive wear on the tread link hinge pins is prevented and also in that uneven strains on the tread belt are prevented.

The tractor attachment is not disabled altogether in the event that one of the drive chains breaks. This of course is an uncommon occurrence but should it happen that one of the chains break, the lugs 22 will engage the pinion 37 and cause the two sprockets 13, 14 to rotate together so that the tractor attachment is driven either at one end or the other.

While the construction and arrangement of the device as herein described and claimed is that of a generally preferred form, obviously modifications and changes may be made without departing from the spirit of the invention or the scope of the claims.

I claim:—

1. A tractor attachment comprising an axle at each end, tread driving sprockets fixed on the axles, a drive axle, and means carried by the drive axle having connection with said axles and normally applying power uniformly to the tread driving sprockets to reduce the strain on the tread elements, said means including differential gearing on the drive axle.

2. Instrumentalities for uniformly applying power to both ends of a tractor attachment, comprising a drive axle, differential gear mechanism mounted on the drive axle, a tread drive sprocket at each end of the attachment, a tractor belt driven by said sprockets, and driving connections between said tread drive sprockets and the differential gearing, said differential gearing compensating for disalinement in the driving connections and insuring the application of power to both ends.

3. Instrumentalities for preventing the disabling of a tractor attachment upon the breakage of a drive chain, comprising in combination a pair of driven sprockets, a drive axle, a differential gearing mounted on the drive axle comprising a pair of drive sprockets with gear portions, loose in respect to the drive axle, a pinion engaging the gear portions with a fixed mounting on the drive axle, drive chains applied to companion drive and driven sprockets, and lugs carried by the drive sprockets, engageable by the pinion upon the breakage of one of the drive chains, to cause the drive sprockets to move together and continue to drive one of the driven sprockets by the intact drive chain.

4. A pair of freely revoluble driving sprockets, a drive axle on the axes of said sprockets, opposed gear portions on the sprockets, a pinion meshing with the gear portions normally locking the drive sprockets together but enabling a limited relative movement of said sprockets thus constituting a differential gearing, a fixed mounting for the pinion on the drive axle, drive chains applied to the drive sprockets for imparting driving movement from the drive axle, and means including lugs extending from the drive sprockets into the plane of the pinion, to be engaged by the pinion upon the breaking of one of the drive chains and releasing the resistance on the companion drive sprocket, to lock the drive sprockets together.

5. A differential gear for imparting uniform driving movement to both ends of a tractor attachment, comprising a drive axle, a spider including bearing hubs with threaded ends keyed on the drive axle, a bevel pinion journaled on a portion of the spider, driving sprockets loosely mounted on the hubs, with segmental bevel gear portions engaged by the pinion, means applied to the threaded portions for holding the driving sprockets in place, and inwardly extending lugs formed on the sprockets and arranged to be engaged by said pinion under abnormal conditions.

6. Means for mounting a tractor attachment, consisting of a relatively fixed axle casing enlarging into a bearing hub, an annular rib on the hub, a drive axle extending through the axle casing and beyond the bearing hub, bearing means between the drive axle and the bearing hub, a frame with bearing means on the extremity of the drive axle, and a companion frame supported on the bearing hub, with a recess receiving the rib, preventing the frames from slipping off and enabling rocking motion thereof.

7. Means for mounting a tractor attachment on the side of a tractor body, consisting of a relatively fixed axle casing on the side of said body enlarging into a bearing hub, an annular rib on the hub, a drive axle from the tractor body extending through the casing beyond the hub and having a bearing in the hub, a frame having bearing on the extremity of the drive axle, a companion frame supported on the bearing hub, with a recess receiving the rib, preventing the frames from slipping off and permitting rocking motion of the tractor attachment in respect to the tractor body, and means extending into engagement with the tractor body from the ends of said attachment, to prevent lateral twisting on the drive axle and to limit the rocking motion of the attachment.

8. Means for preventing lateral twisting of a tractor attachment on a drive axle extending from a tractor body, consisting of a pair of axles journaled in a tractor attachment, a pair of frames located inside of the attachment and supporting the axle, one of said frames having a hub with an annular recess, a drive axle casing mounted on the side of the tractor body and enlarging into a bearing hub on the inside of the tractor attachment, an annular rib on the bearing hub fitting in said recess, permitting vertical rocking motion of said attachment but preventing it from slipping off, and bearing means including rollers supported on the end of the axles, engaging the side of the tractor body.

9. Means for limiting the rocking motion of a tractor attachment in respect to a tractor body, consisting of a pair of axles mounted near the ends of a tractor attachment and projecting toward the side of the tractor body, spring blocks carried by said axles, semi-elliptic springs mounted on said blocks, stops extending from the tractor body between the free ends of the springs, and rollers mounted on the ends of the axles engaging the side of the tractor body.

10. Means for steering a tractor by the manipulation of a pair of tractor attachments, consisting of a two-part drive axle extending into and forming the supports for said tractor attachments, means on the inside of each tractor attachment for driving it from the respective members of the drive axle, a differential gearing at the juncture of the members of the drive axle, driving means applied to said gearing, a brake drum on each axle member, a brake band on each drum, and means for locking the bands either singly or together, said means comprising a two-part brake jack shaft, a differential gearing joining the parts, a foot pedal embodied in the differential gearing effecting the simultaneous rotation of both parts of the jack shaft, handles on each of the parts, and connections between said parts and the brake band.

11. A tractor attachment including a tread belt consisting of tread links with interengaging knuckle joints forming a closed hinge joint, rail portions having cut away sides and leaves arranged to interengage to form continuous tracks, teeth formed in the tread links, and tread drive sprockets having roller teeth for engaging said link teeth.

12. A tread link consisting of a body provided with transverse ridges to strengthen the link laterally, a single knuckle on one edge, a pair of knuckles on the other edge, arranged to aline with the single knuckle of another link, a plurality of rail sections oppositely cut away at the ends to provide leaves, portions extending beyond the extreme rail sections to provide plate recesses, and a tooth formed in the middle of the tread link.

MORTON LEA ADAMS.